United States Patent [19]

Yamamoto et al.

[11] 3,796,493
[45] Mar. 12, 1974

[54] APPARATUS FOR MEASURING PITCH OF PRECISION LEAD-SCREW BY LIGHT-WAVE INTERFERENCE

[75] Inventors: Akira Yamamoto; Isamu Yoshimoto; Yoshihisa Tanimura, all of Tokyo, Japan

[73] Assignee: Tokyo Institute of Technology, Tokyo, Japan

[22] Filed: Dec. 22, 1971

[21] Appl. No.: 210,719

[30] Foreign Application Priority Data
Dec. 23, 1970  Japan.............................. 45-117146

[52] U.S. Cl................. 356/106, 33/199 B, 356/109
[51] Int. Cl............................................. G01b 9/02
[58] Field of Search.......................... 356/106-113; 33/199

[56] References Cited
UNITED STATES PATENTS
2,666,267   1/1954   Root................................... 356/106
3,588,254   6/1971   Rhoades........................... 356/106

FOREIGN PATENTS OR APPLICATIONS
1,131,291  10/1968   Great Britain.................... 33/199 B Primary Examiner—John K. Corbin
Assistant Examiner—Conrad Clark

[57] ABSTRACT

A pair of feelers are brought into contact with the same thread flank of a screw to be measured at two points whose phase differs from each other by 180°. The pair of feelers are mounted on a slide movable in any direction without rotation on a carriage in a plane parallel to a plane in which the carriage travels in the axial direction of the screw to be measured. The feed of the carriage per revolution of a screw to be measured is so adjusted as to be approximately equal to the pitch of the screw. The midpoint between the spherical ends of the pair of feelers in contact with the same thread flank is located at the corner point or vertex of a corner cube reflector which is formed upon the slide. The light beam from the corner cube reflector is reflected by a reflector. The pitch of the screw is measured by the light-wave interference between the light beams separated by a half-mirror, one of which is reflected at the corner cube reflector and the said reflector. The measured value is compared with a reference pitch.

7 Claims, 5 Drawing Figures

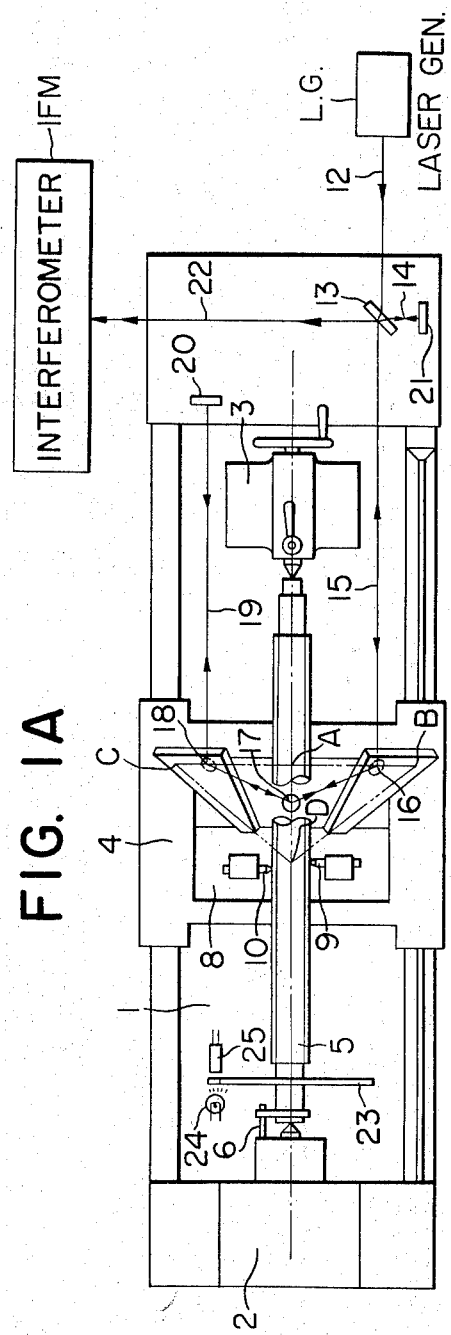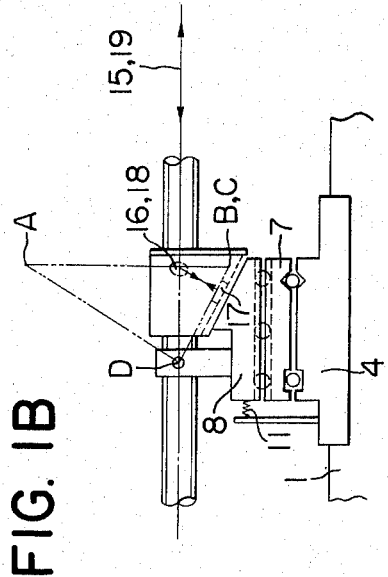

APPARATUS FOR MEASURING PITCH OF PRECISION LEAD-SCREW BY LIGHT-WAVE INTERFERENCE

BACKGROUND OF THE INVENTION:

The present invention relates to a method and an apparatus for measuring a pitch of a precision long screw such as a lead screw used in a machine tool or the like.

In general, the pitch variation is measured in the prior art by an optical method employing a combination of a standard scale with a micrometer microscope. Therefore, the measurement is troublesome, and takes a long time.

It is therefore one of the objects of the present invention to provide a method and an apparatus for measuring a pitch of a screw which can overcome the defects or problems of the prior art methods.

Another object of the present invention is to provide a method and an apparatus for automatically and quickly measuring a pitch of a screw with higher accuracy.

SUMMARY OF THE INVENTION:

The present invention utilizes the interference of light, such as laser light, the interference of which occurs for a long distance.

Briefly speaking, a pitch measuring apparatus in accordance with the present invention is similar in construction to a lathe, and is provided with a headstock, a tailstock, a carriage, and a lead screw. A screw to be measured is held and located between the centers of the headstock and the tailstock, and is rotated about the axis thereof by suitable means such as a dog clamped at the headstock side. The feed of the carriage, which travels in the longitudinal direction of a bed of the measuring apparatus, per revolution of a screw to be measured, is made approximately equal to one pitch of the screw to be measured. For this purpose, the gearing in the headstock is suitably selected.

A slide is mounted through an intermediate plate on the carriage, and is movable in any direction without rotation in a plane parallel to a plane in which the carriage travels. Upon the slide are mounted a pair of feelers and a corner cube reflector. The probing ends of the feelers are adapted to make contact with the same thread flank of a screw to be measured at two points whose phase differs from each other by 180°, and the midpoint of the feeler ends is located at the corner point of the corner cube reflector.

An incident light beam coming from a light source in the longitudinal direction of the bed into the corner cube reflector is reflected by the corner cube reflector and projected upon a reflector located in the other side of the incident light beam source with respect to the screw. The light is then reflected back along the exact course of the incident light beam and an interference of light between the incident light beam and the reflected beam of light is generated. The number of interference fringes during the one revolution of screw is counted at a determined point. The number of fringes is multiplied by the wavelength of the light, and the pitch of the screw is obtained by dividing the product by four. The measured pitch is compared with a reference pitch, and the difference between them is regarded as pitch error.

According to the present invention, the pitch of the screw is measured in terms of the displacement of the slide which in turn is measured by a light-wave interferometer.

The above and other objects, features and advantages of the present invention will become more apparent from the following description of the preferred embodiment thereof taken in conjunction with the accompanying drawings.

BRIEF DESCRIPTION OF THE DRAWING:

FIG. 1A is a top view of one embodiment of the present invention;

FIG. 1B is a fragmentary front view thereof;

Figure 2A:
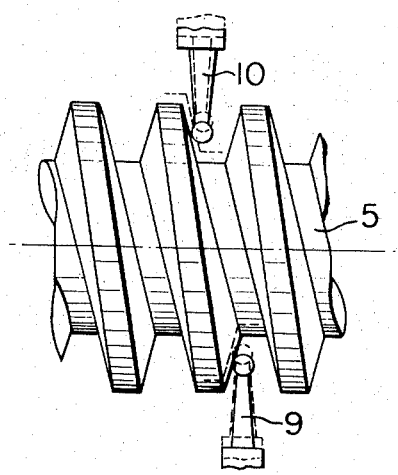
FIG. 2A is a top view, on enlarged scale, illustrating the relation between a screw to be measured and a pair of feelers or probes in the measurement of a screw having a trapezoidal screw thread.

DESCRIPTION OF THE PREFERRED EMBODIMENT:

A pitch measuring apparatus in accordance with the present invention is generally similar in construction to a lathe, and is provided with a bed 1, a headstock 2, a tailstock 3 and a carriage 4. A screw 5 whose pitch is to be measured is held and located between the centers of the headstock 2 and the tailstock 3 and is rotated about the axis by a dog and a driving arm 6. The carriage 4 is movable in the longitudinal direction of the bed 1 by a feed mechanism, not shown, whose gearing is so arranged as to displace the carriage 4 by the distance approximately equal to one pitch of the screw 5 per revolution of the screw.

A slide 8 is mounted on an intermediate plate 7 which in turn is supported on the carriage 4. Rolling contact guide mechanisms generally comprising V-grooves, flat grooves and rolling elements such as steel balls are interposed between the carriage 4 and the intermediate plate 7 and between the intermediate plate 7 and the slide 8 in such a manner that the guides permit the slide 8 to move linearly in two directions at right angles relative to each other and in parallel with the carriage 4.

Two feelers or probes 9 and 10 are securely fixed to the slide 8 at a height equal to that of the axis of the screw to be measured, and are shifted from each other by the distance approximately equal to one-half pitch in the axial direction of the screw 5. Therefore, as shown in FIG. 2A these feelers 9 and 10 may make contact with the same thread flank of the screw at two points whose phase differs from each other by 180°. Under the force of a relatively weak spring 11, the slide 8 is pulled toward the left in FIG. 1B so that it may move axially and laterally of the axis of the screw 5 with respect to the carriage 4 until the feelers 9 and 10 make contact with the thread flank of the screw.

Figure 2C:
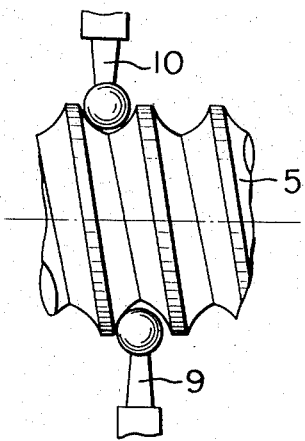
FIG. 2C is a view similar to FIG. 2A illustrating the measurement of a ball retaining screw.
Figure 2B:
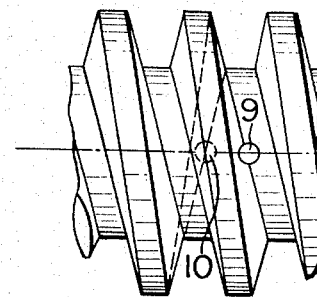
FIG. 2B is a front view thereof.

Errors in measurement are caused by the eccentricity of the center holes, the bending of the screw 5 and the downward deflection thereof under its own weight. However, when the screw 5 is displaced in a horizontal plane, the two feelers 9 and 10 are displaced at right angles relative to the axis of the screw as indicated by the dashed lines in FIG. 2A, but not in the axial direction of the screw 5. The two feelers 9 and 10 are also not displaced in the axial direction as long as the deflection is relatively small even when the screw 5 is deflected in the vertical plane, since, as shown in FIG. 2B, the directions of lead of the thread flank at the points at which the feelers 9 and 10 in contact with the thread flank are opposite. In summary, the slide 8 can be guided along the axis of the screw without being influenced by the errors described above. Furthermore, the eccentricity between the axis of the center on the headstock side and the axis of its rotation and the out of straightness of the carriage travelling course will not cause any error in the axial displacement of the slide 8. Moreover, the error in the feed of the carriage 4 per revolution or the screw is absorbed by the elongation or compression of the spring 11. As a result, the displacement of the slide 8 in the axial direction will not be adversely influenced.

The axial displacement of the slide 8 per revolution of the screw is measured for example with coherent laser light. Referring back to FIG. 1A, light 12 emitted from a laser generator LG is divided into light beams 14 and 15 by a half-mirror 13 fixed to the bed 1. The light beam 15 is reflected by three reflecting mirrors 16, 17 and 18 in the order named, and reaches a mirror 20 securely fixed to the bed 1 as the incident beam 19. The light beam reflected by the mirror 20 is reversed in the path by the reflecting mirrors 18, 17 and 16 in the order named, reaching the half-mirror 13 where it is interfered with the light beam 14 which is reflected by the half-mirror 13 and then re-reflected by a mirror 21. The interfered light beams 22 enters into an interferometer IFM. Light emitted from a light source 24 is intercepted by a phototransistor 25 when a small hole drilled on a disk 23 fitted on one end of the screw 5 is in alignment with the light source 24. Therefore the phototransistor 25 generates an output signal per revolution of the screw 5. The axial displacement of the slide 8 which corresponds to one pitch of the screw 5 to be measured is obtained by multiplying a number of fringes observed in the interferometer during a time interval from one signal from the phototransistor 25 to another by the wavelength of the light and dividing the product by four. Therefore, the pitch error is the difference between the measured pitch or axial displacement of the slide 8 and the reference pitch. The measurement can be made continuously by use of an electronic circuit, and the cumulative pitch error over the whole length of the screw 5 can be displayed digitally in the order of $10^{-4}$ milimeter.

As shown in FIGS. 1A and 1B, the reflecting surfaces of the three reflecting mirrors 16, 17 and 18 are located in three planes ADB, BDC and CDA at right angles with respect to each other of a corner cube ABCD indicated by the two-dot-chain lines. That is, the three reflecting mirrors 16, 17 and 18 constitute a corner cube reflector. The corner cube reflector is obtained by cutting a right hexahedron so as to provide a right triangular section. The light beam incident at right angle to the right triangular surface ABC is reflected by the mutually perpendicular reflecting surfaces to be re-directed in parallel with the incident beam. The corner cube reflector has a characteristic that even when the corner cube is deviated angularly about the corner point D or when the corner point D is deviated in a plane perpendicular to the incident beam, the optical length and the parallelism between the incident and reflected beams remain constant. Because of this particular characteristic of the corner cube reflector, the displacement of the carriage 4 on the bed 1 will not be adversely affected by the yawing error (that is, the error caused by the horizontal angular rotation about a vertical axis), the pitching error (that is, the error caused by the angular rotation about a transverse horizontal axis), and the deviation of the carriage in a plane perpendicular to the direction of the movement of the carriage. It should be noted that the corner point D is located at the midpoint between the two feelers 9 and 10. The pitch measurement is influenced by the rolling error of the carriage (that is, the error caused by transverse angular rotation about the horizontal axis), but the error is negligible.

Now referring to FIG. 2C, the method for measuring the pitch of a thread groove of a ball retaining screw will be described hereinafter. The measurement is influenced by the lateral deviation of the screw because the cross section of the thread is not linear. However, the measurement is made under the conditions under which the ball retaining screw is actually used if the diameter of the spherical ends of the feelers 9 and 10 is made substantially equal to that of the balls fitted into the retaining screw. Therefore, the method and apparatus of the present invention are best suited for measuring the pitch of a thread groove of a ball retaining screw.

As described above, the present invention is based on the principle that a screw can be located at the corner point D which is an imaginary point but can be used as a space in practice. Therefore, it will be readily seen to those skilled in the art that the method and apparatus of the present invention can be employed in the measurements of not only the screws but also graduated scales. In the latter case, the imaginary corner point is set at the graduated scales by a micrometer microscope, and the distance between the adjacent graduated scales is measured by an interferometer.

What is claimed is:

1. A pitch measuring apparatus for measuring a pitch of a screw comprising
   a means for holding a screw to be measured for rotation about the axis thereof;
   b means for rotating said screw about the axis thereof;
   c a carriage adapted to displace in parallel with said axis;
   d a slide mounted on said carriage movable in any direction without rotation in a plane in parallel to a plane in which said carriage travels;
   e a pair of feelers spaced a constant distance apart and mounted on said slide in such a manner that said pair of feelers can make contact with the same thread flank of said screw at two points whose angular displacement with respect to the axis of the screw is 180°;
   f a corner cube reflector formed on said slide and having a corner point at the midpoint between said feelers;
   g a light source adapted to emit light in parallel with said axis;
   h means for reflecting said light emitted from said light source in said corner cube reflector and reversing said light reflected in said corner cube reflector to cause the light-wave interference; and
   i means for detecting said light wave interference.

2. The pitch measuring apparatus as set forth in claim 1 wherein said screw is located in the space defined in the proximity of the corner point of said corner cube reflector.

3. A pitch measuring apparatus as set forth in claim 1 wherein the diameter of the spherical ends of said pair of feelers in contact with said same thread flank is made equal to that of the steel balls which are retained in a ball retaining screw to be measured.

4. A pitch measuring apparatus as set forth in claim 1 wherein the diameter of the spherical ends of said pair of feelers in contact with said same thread flank is made substantially equal to that of the steel balls which are retained by a ball retaining screw to be measured.

5. A pitch measuring apparatus as set forth in claim 1 wherein said light wave interference means comprises
   a a light source;
   b a half-mirror adapted to split light from said light source into two light beams by reflection and transmission;
   c said corner cube reflector in which said light beam transmitted through said half-mirror is reflected;
   d a first reflector adapted to reflect back and reverse in direction the light beam emerging from said corner cube reflector;
   e a second reflector disposed so as to reflect back said light reflected by said half mirror back toward said half mirror to cause the light-wave interference with said light emerging from said corner cube reflector after said reflection by said first reflector; and
   f a light-wave interferometer positioned to detect said light wave interference.

6. A pitch measuring apparatus in accordance with claim 1, wherein said corner cube reflector is comprised of three reflective surfaces mounted in three planes at right angles with respect to each other, the three planes being positioned to define an imaginary hexahedron.

7. A method for measuring a pitch of a screw comprising holding and locating a screw to be measured between the centers of a headstock and a tailstock of a pitch measuring apparatus; contacting the same thread flank of said screw with a pair of feelers at two points whose angular displacement with respect to the axis of the screw is 180°, fixing said pair of feelers to a slide mounted and movable in any dirction without rotation on a carriage in a plane parallel with a plane in which said carriage travels on a bed of said pitch measuring apparatus; rotating said screw to be measured about the axis thereof while said contact of said pair of feelers with said same thread flank is maintained, and reflecting light from a light source off of a corner cube reflector positioned with a corner point at the mid-point between said feelers for determining the pitch of said screw by measuring the displacement of said slide in the axial direction of said screw.

* * * * *